UNITED STATES PATENT OFFICE.

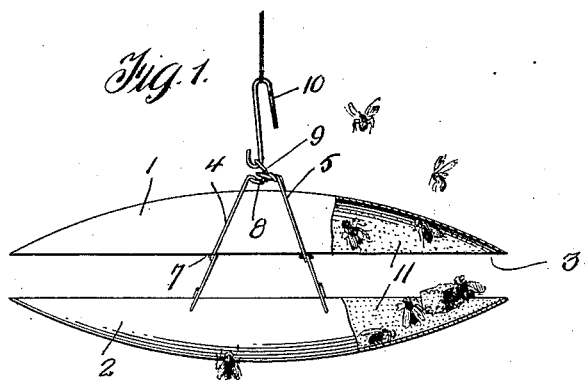
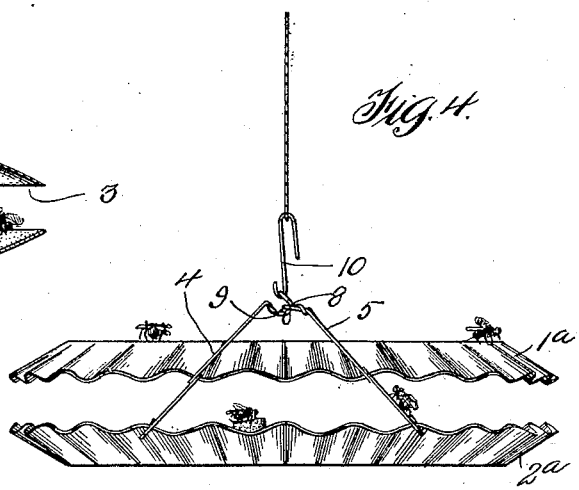
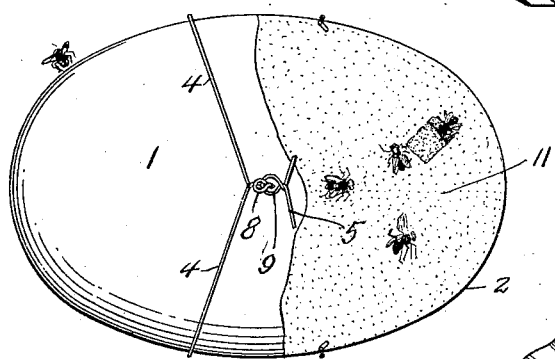
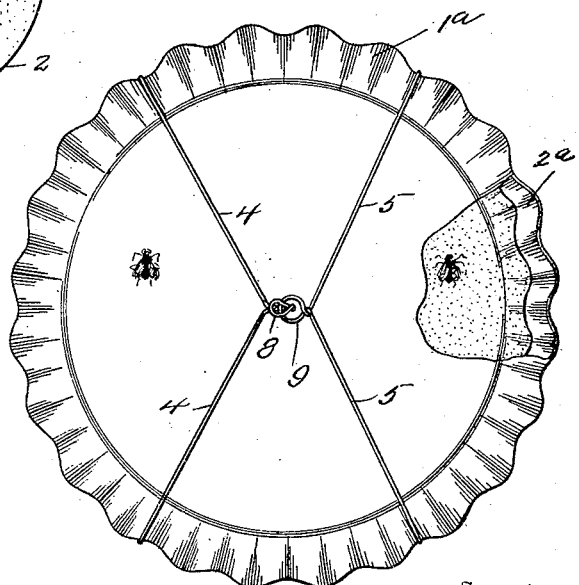
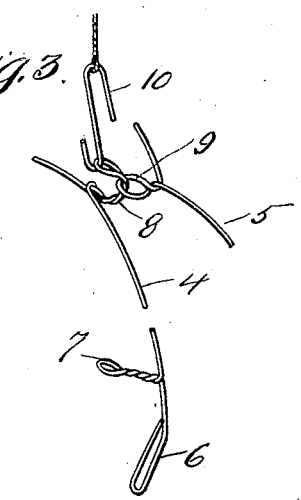

GODFRIED LAUBE AND HATTIE R. LAUBE, OF SANTA MONICA, CALIFORNIA; SAID GODFRIED LAUBE ASSIGNOR TO GEORGE N. BARTLETT, OF LOS ANGELES, CALIFORNIA.

FLY-TRAP.

944,882.　　　　Specification of Letters Patent.　　Patented Dec. 28, 1909.

Application filed March 6, 1909. Serial No. 481,701.

*To all whom it may concern:*

Be it known that we, GODFRIED LAUBE and HATTIE R. LAUBE, citizens of the United States of America, residing at Santa Monica, in the county of Los Angeles and State of California, have invented certain new and useful Improvements in Fly-Traps, of which the following is a specification, reference being had therein to the accompanying drawing.

This invention relates to a fly trap, and the objects of our invention are, first, to provide a simple and inexpensive trap which when injured, or has served its usefulness, can be easily renewed; second, to provide a trap that can be suspended from a suitable support or placed upon a support in the vicinity of which flies or insects are annoying; and third, to provide a sticky fly paper holder, for holding a piece of sticky fly paper whereby persons cannot contact with the same and whereby the carcasses of the insects caught will be practically invisible.

We attain the above objects by a structure that will be presently described and then claimed.

In the drawings, Figure 1 is a side elevation of the fly trap partly broken away and partly in section, Fig. 2 is a plan of the same partly broken away, Fig. 3 is a perspective view of a portion of the wire frame of the trap, Fig. 4 is a side elevation of a modified form of a trap, and Fig. 5 is a plan of the same partly broken away.

To put our invention into practice, we provide two wooden or paper plates 1 and 2 of that type commonly used by grocers for delivering lard or butter, these plates also being used for picnic purposes.

The plates as shown in Figs. 1 and 2 are arranged one above the other with the concaved faces thereof confronting, said plates form a trap or inclosure having a peripheral entering space 3.

For supporting the plate 1 in a superimposed position relative to the plate 2, a wire frame is used, said frame comprising wire stirrups 4 and 5. These stirrups have the lower ends bent to provide hooks 6 for engaging the upper edges of the dish 2, and said stirrups adjacent to the ends thereof are bent and twisted to provide inward projections 7 upon which the lower edges of the plate 1 are adapted to rest. The stirrups intermediate the ends thereof are bent to provide a hook 8 and an eyelet 9, the former being carried by the stirrup 4, and the latter by the stirrup 5. The hook 8 is adapted to engage the eyelet 9, and when it is desired to suspend the trap from a suitable support, an additional hook 10 can be placed in engagement with the hook 8, as shown in Figs. 1 and 3.

The inner sides of the plates 1 and 2 can be coated with an adhesive material 11, or sticky fly paper can be cut to conform to the shape of the plate 2 and placed therein. The outer sides of the plates 1 and 2 can be painted or otherwise decorated to present a neat appearance. The shape of the plate 2 permits of a bait, as a lump of sugar, being placed in the trap to attract flies or insects within the vicinity of the trap.

In Figs. 4 and 5 of the drawings, we have illustrated a modification of our invention, wherein circular crimped plates $1^a$ and $2^a$ are used in lieu of the oval-shaped plates 1 and 2 previously described. The same type of wire frame is employed for retaining the plates $1^a$ and $2^a$ in position.

Since the plates of the trap can be obtained at an exceptionally low cost, it is possible to produce a fly trap or sticky fly paper holder constructed in accordance with our invention, at a comparatively small cost, consequently, a trap or holder can be discarded without extravagance after flies have been caught thereby.

Having now described our invention, what we claim as new, is;—

A fly trap, comprising two concaved bait-carrying plates arranged in spaced relation one above the other with the concaved faces thereof confronting, and a support for the plates comprising a pair of stirrups, each formed of a single piece of wire having the free ends thereof formed with hooks engaged with the lowermost plate and having projections near said free ends, one of said stirrups having an eye and the other having a hook engaging therewith, the uppermost plate received between the hook and eye and the projections on the stirrups and resting on the latter.

In testimony whereof we affix our signatures in the presence of two witnesses.

GODFRIED LAUBE.
　　　　　　　　HATTIE R. LAUBE.

Witnesses:
　　BLANCHARD OGDEN,
　　ALFRED STEERS.